United States Patent
Seba et al.

(10) Patent No.: US 12,092,015 B2
(45) Date of Patent: *Sep. 17, 2024

(54) ENGINE HAVING PRECHAMBER IGNITION AND METHOD OF CONTROLLING SUCH AN ENGINE

(71) Applicant: Liebherr Machines Bulle SA, Bulle (CH)

(72) Inventors: Bouzid Seba, Broc (CH); Ulrich Weiss, Villars-sur-Glâne (CH); Bakir Puran, Vuisternens-en-Ogoz (CH); Roberto Andreutti, Barbengo (CH)

(73) Assignee: Liebherr Machines Bulle SA, Bulle (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,697

(22) Filed: May 23, 2023

(65) Prior Publication Data

US 2023/0366343 A1    Nov. 16, 2023

Related U.S. Application Data

(63) Continuation of application No. 17/686,839, filed on Mar. 4, 2022, now Pat. No. 11,698,021, which is a
(Continued)

(30) Foreign Application Priority Data

Apr. 23, 2020 (CH) .................................. 00481/20
Jan. 26, 2021 (CH) .................................. 00073/21

(51) Int. Cl.
*F02B 19/12* (2006.01)
*F02B 19/02* (2006.01)
(Continued)

(52) U.S. Cl.
CPC .............. *F02B 19/02* (2013.01); *F02B 19/12* (2013.01); *F02M 25/028* (2013.01); *F02M 31/20* (2013.01); *F02M 61/14* (2013.01)

(58) Field of Classification Search
CPC ........ F02B 19/02; F02B 19/12; F02M 25/028; F02M 31/20; F02M 61/16
(Continued)

(56) References Cited

U.S. PATENT DOCUMENTS 3,970,054 A * 7/1976 Henault ................ F02B 19/108
                                                              239/87
4,441,476 A   4/1984 Roberts et al.
(Continued)

FOREIGN PATENT DOCUMENTS

DE    10 2017 219560 A1    5/2018
JP         2001-082148 A    3/2001
(Continued)

OTHER PUBLICATIONS

JP-2019044780-A (Otsu Masaki) (Machine Translation) (Year: 2019).*
(Continued)

*Primary Examiner* — Mahmoud Gimie
(74) *Attorney, Agent, or Firm* — Dilworth & Barrese, LLP

(57) ABSTRACT

The invention relates to an engine having prechamber ignition, in particular a gas engine, that comprises a main combustion space in a cylinder of the engine for combusting an air-fuel mixture and a prechamber having an ignition device arranged therein and a fuel injector arranged therein, wherein the prechamber has at least one transfer port that fluidically connects the prechamber to the main combustion space. The engine is characterized in that the fuel injector
(Continued)

arranged in the prechamber is the only fuel injector via which fuel can be introduced into the associated main combustion space.

26 Claims, 5 Drawing Sheets

Related U.S. Application Data continuation of application No. 17/234,893, filed on Apr. 20, 2021, now Pat. No. 11,300,038.

(51) Int. Cl.
    *F02M 25/028* (2006.01)
    *F02M 31/20* (2006.01)
    *F02M 61/14* (2006.01)

(58) Field of Classification Search
    USPC .......................................... 123/260
    See application file for complete search history.

(56) References Cited

U.S. PATENT DOCUMENTS

| | | |
|---|---|---|
| 5,483,933 A | 1/1996 | Kawamura |
| 2003/0196634 A1 | 10/2003 | Lausch et al. |
| 2011/0088655 A1 | 4/2011 | Ancimer et al. |
| 2015/0027115 A1* | 1/2015 | Watanabe ........... F02B 29/0412 60/599 |
| 2015/0241306 A1 | 8/2015 | Sixel et al. |
| 2015/0361943 A1* | 12/2015 | Sixel ..................... F02D 35/023 123/406.45 |
| 2016/0169142 A1 | 6/2016 | Klingbeil et al. |
| 2016/0341105 A1 | 11/2016 | Gu |
| 2017/0122184 A1 | 5/2017 | Hampson et al. |
| 2018/0166862 A1 | 6/2018 | Rabhi |
| 2020/0158005 A1* | 5/2020 | Singh ..................... F02M 25/08 |
| 2021/0115840 A1* | 4/2021 | Michels ............. F02B 29/0481 |

FOREIGN PATENT DOCUMENTS

| | | | | |
|---|---|---|---|---|
| JP | 2001-263069 A | | 9/2001 | |
| JP | 2006-322367 A | | 11/2006 | |
| JP | 2019044780 A | * | 3/2019 | |
| WO | WO-0183646 A2 | * | 11/2001 | ................ C10L 1/14 |
| WO | 2015/138987 A1 | | 9/2015 | |

OTHER PUBLICATIONS

WO-0183646-A2 (Masamitsu et al.) (Machine Translation) (Year: 2001).*

* cited by examiner

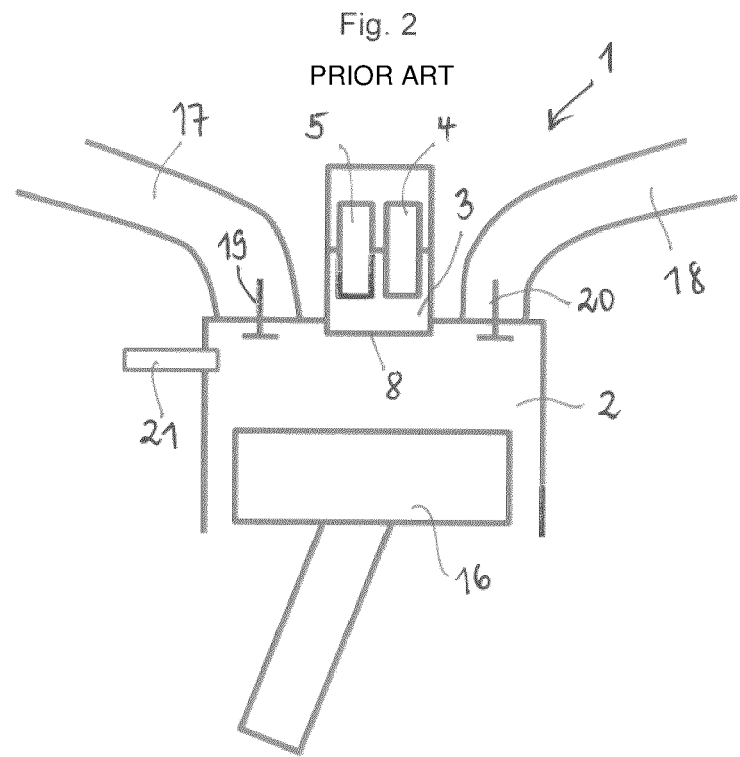
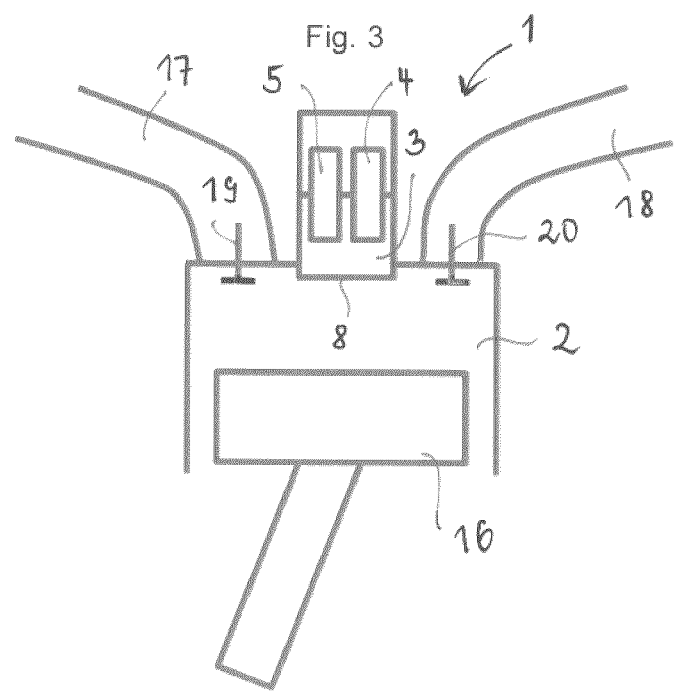

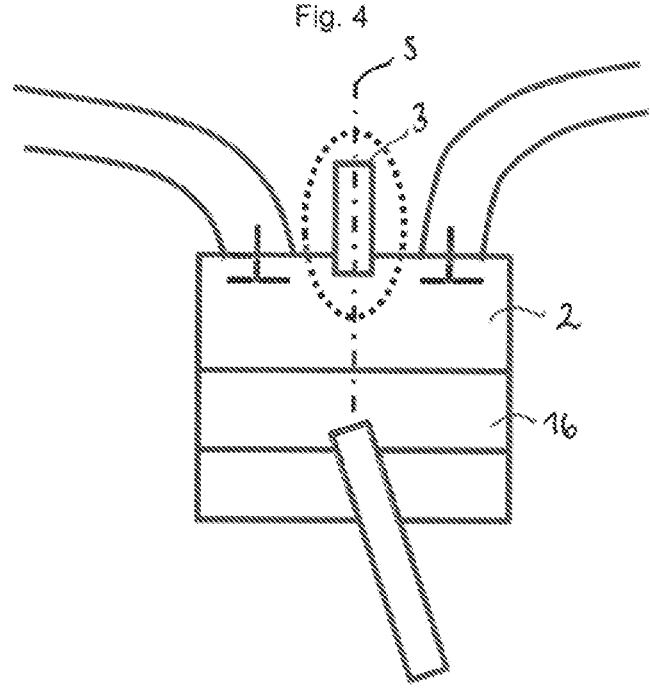
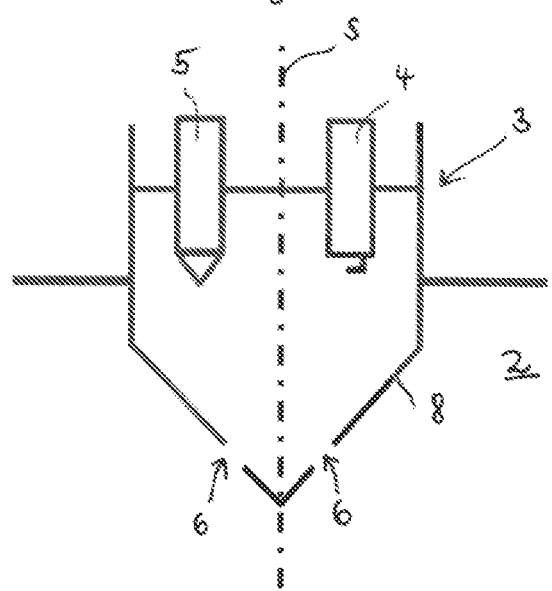

ENGINE HAVING PRECHAMBER IGNITION AND METHOD OF CONTROLLING SUCH AN ENGINE

BACKGROUND OF THE INVENTION

The present invention relates to an internal combustion engine—called an engine in the following—having prechamber ignition and to a method of controlling such an engine. In accordance with the invention, the engine can in particular be a gas engine and/or can be operated with hydrogen or with a fuel similar to hydrogen.

The use of gaseous fuels will even become reality for long distance trucks and/or for mobile work machines due to legislative changes in the taxation of fuel and/or due to exhaust emission legislation. Among gaseous fuels, hydrogen, for example, provides the option of an almost climate neutral "well to tank provision". Hydrogen can furthermore also be used in mobile fuel cell drives and thus in actually emission free (zero emission) vehicles. Hydrogen engines offer the potential of being able to observe even strict exhaust gas limits solely by internal engine measures so that at least the exhaust aftertreatment system can be substantially reduced.

Some criteria of fundamental significance for an engine include the efficiency and the untreated emissions, with a distinction having to be made here between the emitted pollutants by type and quantity. As is known, different groups of pollutants in part also require different kinds of exhaust aftertreatments that in turn differ in their effort with respect to purchase and operating costs. Generally known examples of such pollutant groups include particulates, nitrogen oxides, and hydrocarbons.

The nitrogen oxides ($NO_x$) and non-combusted hydrocarbons that are produced in different concentrations in dependence on the operating point of the engine and that require a corresponding aftertreatment are relevant to such gas engines operated with conventional gases (e.g. natural gas, liquefied petroleum gas—also called LPG).

As is known, the operating of engines in the range of stoichiometric combustion with an increasing excess of air produces an increase in $NO_x$ emissions. An increasingly higher excess of air enables an increase in engine efficiency, which also still applies far away from stoichiometric combustion—i.e. with lambda values considerably greater than 1 (cf. the description passage on FIG. 1 below).

A large gain in the mentioned efficiency increase represents an increase in the compression ratio, which requires a raising of the knock limit with spark ignition engines. This is satisfied with an engine operation having a corresponding excess of air (that is a high lambda value) so that a decision is frequently made for a so-called lean combustion with engines permanently operated at high performance values and for engines with high mileages. For the example of natural gas, such engines are operated at a combustion air ratio lambda of 1.2 to 1.5.

With an unchanging fuel supply amount, an increasing lambda value per se effects an increasing charge air amount supplied to the combustion space, which provides a lowering of the combustion temperature under the condition that the supplied charge air does not have any greatly elevated temperature, whereby a drop in $NO_x$ emissions and an increase in knock resistance occur. The disadvantage admittedly results for carbon based fuels on their combustion at a high lambda value of an emission increase of non-combusted or partially combusted hydrocarbons that can, however, be removed in the exhaust gas with a smaller effort than nitrogen oxides. Nevertheless—as already mentioned—an engine operation with a comparatively high excess of air is frequently preferred since this makes higher efficiency values possible and non-combusted hydrocarbons in the exhaust gas can be removed with a smaller effort in the exhaust gas than nitrogen oxides.

There are, however, limits to the lean combustion because the air-fuel mixture—also called a mixture in the following text—no longer has a sufficiently high ignition capability and/or a sufficiently high combustion rate from a certain excess of air onward, i.e. from a certain lambda value of the air-fuel mixture onward, in dependence on the type and quality of the fuel.

In order also to provide a reliable ignition with a lean mixture in the combustion space respectively in the main combustion space, a richer and thus more easily ignitable mixture can be provided in a device spatially separate from the main combustion space of a cylinder, a so-called flushed prechamber, said mixture being ignited with the aid of a primary ignition device—called a spark plug in the following—and resulting via corresponding transfer ports in an ignition of the lean combustion mixture in the main combustion space.

The prechamber here introduces a very much higher energy into the main combustion space than would be the case by a spark plug or the like so that correspondingly highly lean combustion mixtures can be ignited in the main combustion space.

Provision can be made in accordance with a further development of the invention that the volume of the main combustion space, i.e. the cubic capacity, is in a range from 1.5 to 3 liters, preferably from 2 to 2.5 l, with the volume of the prechamber being 1 to 5 ccm, preferably 2 to 3 ccm.

In accordance with an alternative or supplementary further development, a compression ratio can preferably be provided between 11 and 20, particularly preferably between 11 and 17, and very particularly preferably between 12 and 15. Due to a scalability of these value ratios, provision can accordingly be made that the quotient of (i) the volume of the main combustion space in the top dead center position of the piston and (ii) the prechamber volume is preferably between 0.6% and 3%, particularly preferably between 0.75% and 2.8%, and very particularly preferably between 0.9% and 2.7%.

In accordance with an alternative or supplementary further development, the total cross-section of the transfer ports for an engine having the provided cubic capacity can preferably have a value between 3 $mm^2$ and 12 $mm^2$ and particularly preferably 3.5 $mm^2$ and 10 $mm^2$, and very particularly preferably 4 $mm^2$ and 8 $mm^2$. Due to a scalability of these value ratios indicated by way of example, provision can accordingly be made that the quotient in the unit of meters of (i) the volume of the main combustion space in the top dead center position of the piston and (ii) the total cross-section of the transport ports preferably has a value between 12 and 90, particularly preferably between 16 and 80, and very particularly preferably between 14 and 60.

In addition to an advantageous distribution of the mixture components in the main combustion space, an ordered ignition of the mixture present in the main combustion space represents a technical challenge so that a combustion ultimately takes place therein that is as optimum as possible. The prechamber—irrespective of whether it is a flushed or non-flushed prechamber—and the fuel injector—called an injector in the following—of the main combustion space have therefore always competed for the optimum arrangement position at which a charging with fuel that is as advantageous as possible or an injection of the ignition torches that is as advantageous as possible is possible.

SUMMARY OF THE INVENTION

The aim of the present invention is the provision of a device and of a method for an engine, in particular for a gas engine, by which a particularly high lean combustion is possible, that is particularly favorable in manufacture, and that is simple in its structural design.

This is done by an engine that has all the features described herein. Further advantageous embodiments are also described herein.

In accordance with the invention, an engine having prechamber ignition, in particular a gas engine, is provided that comprises a main combustion space in a cylinder of the engine for combusting a mixture and a prechamber having an ignition device arranged therein or projecting therein and an injector arranged therein or projecting therein, wherein the prechamber has at least one transfer port that represents a fluid connection between the prechamber and the main combustion space. The engine is characterized in that the injector arranged in the prechamber is the only injector or the only inlet via which fuel can be introduced into the associated main combustion space. As is clear to the skilled person, the engine is an internal combustion engine that has at least one cylinder that accommodates the main combustion space and with which a prechamber is associated.

The subject of the invention is based on the approach that the total fuel supply into the main combustion space comes from the injector arranged in the prechamber.

Both a quasi-direct injection of fuel from a particularly advantageous position is thus possible with a corresponding positioning of the prechamber. The consideration previously to be made for an engine having direct injection with respect to the two mutually competing arrangement positions of an injector in the main combustion space and in the prechamber has accordingly been resolved.

To increase the knock resistance and/or to enable particularly high efficiencies, a late fuel injection, i.e. an injection only taking place directly before the ignition, is advantageous. This can be achieved by a direct injection at a pressure of some hundred bar. However, increased attention must be paid to the mixture formation with a late injection. A poor mixture formation in the combustion space can result in increased emissions, in efficiency losses, in a reduction of the power output capacity, and/or in increased loads on certain components. The engine in accordance with the invention can accordingly have the advantages of a direct fuel injection with a particularly advantageous positioning of the fuel supply into the main combustion space.

A considerably better reproducible ignition of the mixture is achieved with a moderate effort by the use of a flushed prechamber, that is a prechamber that—as in the invention—has an injector arranged therein. A very considerable concentration of the collective of the ignition procedures to this optimum is achieved by corresponding efforts to trigger the ignition in the main combustion space at the respective optimum point in time. With respect to dynamically operated engines, a flushed prechamber can be operated independently of the instantaneous operating point of the engine at such an almost unchanging combustion air ratio lambda that is particularly advantageous for the ignition of the mixture by the external ignition source there. The arrangement position that can be selected as desired further provides that the prechamber can be arranged at an advantageous position, whereby the transfer points can be particularly advantageously positioned in their function as prechamber outlets, whereby the ignition of the mixture layers in the main combustion space takes place favorably, whereby an efficient combustion of the fuel introduced therein occurs.

Provision can be made in accordance with an optional modification of the invention that the engine is a spark ignition engine or a gasoline engine.

Provision can further be made that the engine is a gas engine. The prechamber then serves as an ignition amplifier, with its volume being orders of magnitude smaller than the main combustion space. The main combustion space can thus be more than times, preferably more than 50 times, as large as the prechamber acting as an ignition amplifier.

Provision can be made in accordance with a modification of the invention that the main combustion space, that Is preferably cylindrical or approximately cylindrical, has an axis of symmetry that coincides with an axis of symmetry of the prechamber of the prechamber housing.

It can thus be ensured, for example, that the ignition torches injected from the prechamber penetrate as synchronously as possible into the mixture layers in the main combustion space and ignite these layers in an ordered manner. The positioning of a prechamber in accordance with the invention on the axis of symmetry of the main combustion space achieves an approximately optimum mixture formation in the main combustion space and simultaneously provides a uniform ignition.

Provision can further be made here that the main combustion space, that Is preferably cylindrical or approximately cylindrical, has an axis of symmetry that coincides with an arrangement position of the injector in the prechamber.

An even better distribution of the fuel in the main combustion space is hereby achieved since the discharge of fuel into the prechamber or from the prechamber into the main combustion space takes place uniformly.

Provision can inter alia also be made in accordance with the invention that the preferably cylindrical or approximately cylindrical main combustion space has an axis of symmetry that is simultaneously an axis of rotation for a plurality of transfer points arranged rotationally symmetrically therewith in the transition from the prechamber and the main combustion space. A uniform ignition of the mixture in the main combustion space is thereby achieved through the ignition torches injected from the transfer points of the prechamber.

The prechamber itself and/or the prechamber housing can also have an axis of symmetry that coincides with the axis of symmetry of the main combustion space.

Provision can be made in accordance with an optional modification of the invention that a valve is present in a wall separating the prechamber and the main combustion space, said valve providing a selective additional fluidic connection between the prechamber and the main combustion space beside the at least one transfer point. This fluidic connection that can be provided by the valve is closable.

The separating wall here defines the boundary between the prechamber and the main combustion space and is perforated by the at least one transfer point (that are also called prechamber outlets).

A valve that can selectively close or open a fluid connection of the prechamber and the main combustion space is arranged beside the at least one transfer point in the separating wall. There is thus an additional opening in the separating wall that, unlike the at least one transfer point, is closable and through which, for example, fuel can flow from the prechamber into the main combustion space; equally mixture into the prechamber.

Provision can be made in this respect that the valve is an actively controllable valve to form an additional fluidic connection between the prechamber and the main combustion space as required. The active controllability of this valve can advantageously contribute to a uniform distribution of the fuel in the main combustion space.

Provision can, however, also be made in accordance with the invention that the valve is a passive valve that forms an additional fluidic connection between the prechamber and the main combustion space in an open state and closes this additional fluidic connection in a closed state. The valve can here preferably adopt a closed position when a pressure in the prechamber is greater than a pressure in the main combustion space and can adopt an open state when a pressure in the prechamber is smaller than a pressure in the main combustion space.

This has the result that with an open valve an increased flow cross-section is present for the mixture that is to be introduced from the main combustion space into the prechamber and that is required for the carrying in of air respectively oxygen in the present case of a flushed prechamber, whereas on an ignition of the mixture in the prechamber the valve closes due to the pressure that is thereby very high and a reduced passage that is formed only by the at least one transfer point is present through the separating wall so that there is an advantageous, very fast and/or very deep penetration of the ignition torches into the mixture layers of the main combustion space.

As intended, this additional flow cross-section that can be provided through the valve is therefore not available to the ignition torches discharged from the prechamber, but only the transfer points can be used that can therefore be optimized to their function as so-called prechamber outlets. The reverse flow direction to receive mixture into the prechamber so that oxygen or air is present there can then take place to a predominant extent via the open valve.

Provision can furthermore be made in accordance with a further development of the invention that the valve has a valve plunger that is movably arranged in the wall separating the prechamber and the main combustion space and that is preferably preloaded toward a side by means of a spring element.

The preload can optionally be adapted in a specific strength such that on excess pressure in the prechamber that is present on the fuel injection, the valve is open, whereas the valve closes abruptly on the ignition of the prechamber mixture.

In this respect, for example, the fluidic connection can be a channel arranged in the valve plunger that is closed by the separating wall when the plunger is deflected in the direction of the main combustion space and represents a fluidic connection between the prechamber and the main combustion space when the plunger is deflected in the direction of the prechamber. A T-shaped channel in the valve plunger can be considered here, for example, so that an easy closing of the channel takes place by a latching of the plunger into the separating wall on a corresponding deflection of the plunger.

It can thus be ensured, for example, that the valve is closed when the mixture in the prechamber has just ignited, which simultaneously corresponds to the time period in which the excess pressure present in the prechamber is highest with respect to the pressure present in the main combustion space.

Provision can furthermore be made in this respect that the wall separating the prechamber and the main combustion space and the valve plunger are configured such that a respective side of the wall is aligned flush with the valve in an open and/or closed state.

Such swirls that are disadvantageous for a propagation of a flame front or for a specific desired flow shape can thus be prevented.

Provision can be made in accordance with a further optional modification that the valve or a valve plunger of the valve is arranged coaxially to an axis of symmetry of the main combustion space, is preferably also arranged coaxially to an axis of symmetry of the prechamber and/or of the prechamber housing.

Provision can furthermore be made in accordance with an advantageous embodiment that the fluidic connection through the separating wall formed in an open state of the valve is symmetrical or rotationally symmetrical with an axis of symmetry of the main combustion space.

Provision can be made in accordance with the invention that the engine is operated with hydrogen or with a fuel that contains hydrogen as its main component or as an admixture (e.g. hythanes) or that it is another fuel whose ignition capability is also sufficient for lambda values beyond 2.5, preferably beyond 3, and very particularly preferably beyond 5.

Provision can furthermore be made that the engine is provided with a multistage charging of the air to be introduced into the main combustion space, with at least one charge air cooler preferably respectively being arranged in a charge air path between the individual stages of the charging or with an associated charge air cooler being respectively arranged downstream in the charge air path for each of the stages.

On the implementation of a multistage charging, provision can be made in accordance with the invention that with at least two compressor units of the multistage charging connected in series a respective one charge air cooler is arranged directly downstream that cools the charge air compressed by a compressor unit and raised in temperature. Provision is preferably made in this respect that the at least two charge air coolers respectively arranged downstream of a compressor unit are integrated at the secondary side in mutually independent cooling circuits of which at least one is not in fluidic communication with a primary cooling circuit connected to the engine. Provision can be made in both these circuits that the two respective circulation pumps and heat exchangers by which the thermal power removed from the respective cooling circuit to the waste heat sources of the engine is led off to the environmental air are separate from one another.

Provision can be made that the cooling circuit that is separate from the primary cooling circuit of the engine and that is also called a low temperature circuit has a circulation pump that is preferably operated according to requirements and the separate cooling circuit can thus be operated with a definably variable cooling capacity. This circulation pump and/or a fan at the outer heat exchanger via which the low temperature circuit leads off thermal power to the environment can thus, for example, be driven via a controlled or regulated electric machine so that the low temperature cooling circuit only provides a very small flow temperature and a very high coolant mass current when this is necessary or so that this only takes place when a corresponding additional value for the engine is considered in a total system from this energy effort required for this purpose.

Provision can be made in accordance with an optional further development of the present invention that a water spray device for spraying water into the charge air path is provided for cooling the charge air, with the water sprayed into the charge air path preferably being a condensate from the exhaust gas.

Water acquired from the exhaust gas can therefore accordingly be used for cooling charge air. For this purpose, a water spray device can be provided that injects water into the charge air path to cool the charge air.

Provision can be made in accordance with the invention that the single stage or multistage charging is variable in its power, preferably by a controllable and/or regulable compressor. This can be implemented, for example, by an exhaust gas turbocharger having an individually controllable waste gate, a turbocharger having a variable turbine geometry, a charger driven by an electric drive, etc. Such a charging as required prevents unnecessarily strong charging in the lower and middle load ranges of the engine and consequently saves energy.

In accordance with a variant of the invention, provision can be made that the fuel injector is configured to inject a fuel, preferably hydrogen or a fuel comprising more than 70% molecular hydrogen, having a pressure in the range from 200 to 500 bar, preferably 200 to 400 bar, more preferably 250 to 350 bar, and very particularly preferably in the range from 290 to 310 bar. An exemplary value for a pressure for injecting fuel through the fuel injector is 300 bar.

The invention additionally relates to a method of controlling an above-described engine that is provided with an actively controllable valve in the separating wall of the prechamber and main combustion space, wherein the valve is closed just before the end of the fuel supply taking place via the injector so that the fuel supplied into the main combustion space at the end flows completely through the transfer points to provide an additional swirl of a mixture in the main combustion space.

This additional swirl provides a particularly good mixing of the mixture in the prechamber and accordingly provides a uniform jet pattern that is simultaneously as optimum as possible of the ignition torches injected out of the prechamber.

Provision can further be made that the valve is temporarily open during a compression phase of the cylinder to effect an increase of the combustion air number lambda increased thereby in the prechamber provided that this is advantageous from a technical function aspect or also to enable the use of such fuel whose ignition capability requires it.

The invention additionally relates to an on-road or off-road vehicle, in particular to a mobile work machine, having an engine in accordance with one of the preceding presented variants.

BRIEF DESCRIPTION OF THE DRAWINGS

Further advantages, features, and details of the present invention will become clear on the basis of the following description of the Figures. There are shown:

FIG. 2: a schematic representation of a cylinder arrangement of a conventional engine having direct injection and a flushed prechamber;

FIG. 3: a schematic representation of cylinder arrangement of an engine in accordance with the invention;

FIG. 4: a schematic representation of a preferred embodiment of the present invention;

FIG. 5: a schematic representation of a detail view of an embodiment of a prechamber;

DESCRIPTION OF THE PREFERRED EMBODIMENTS

Figure 1:
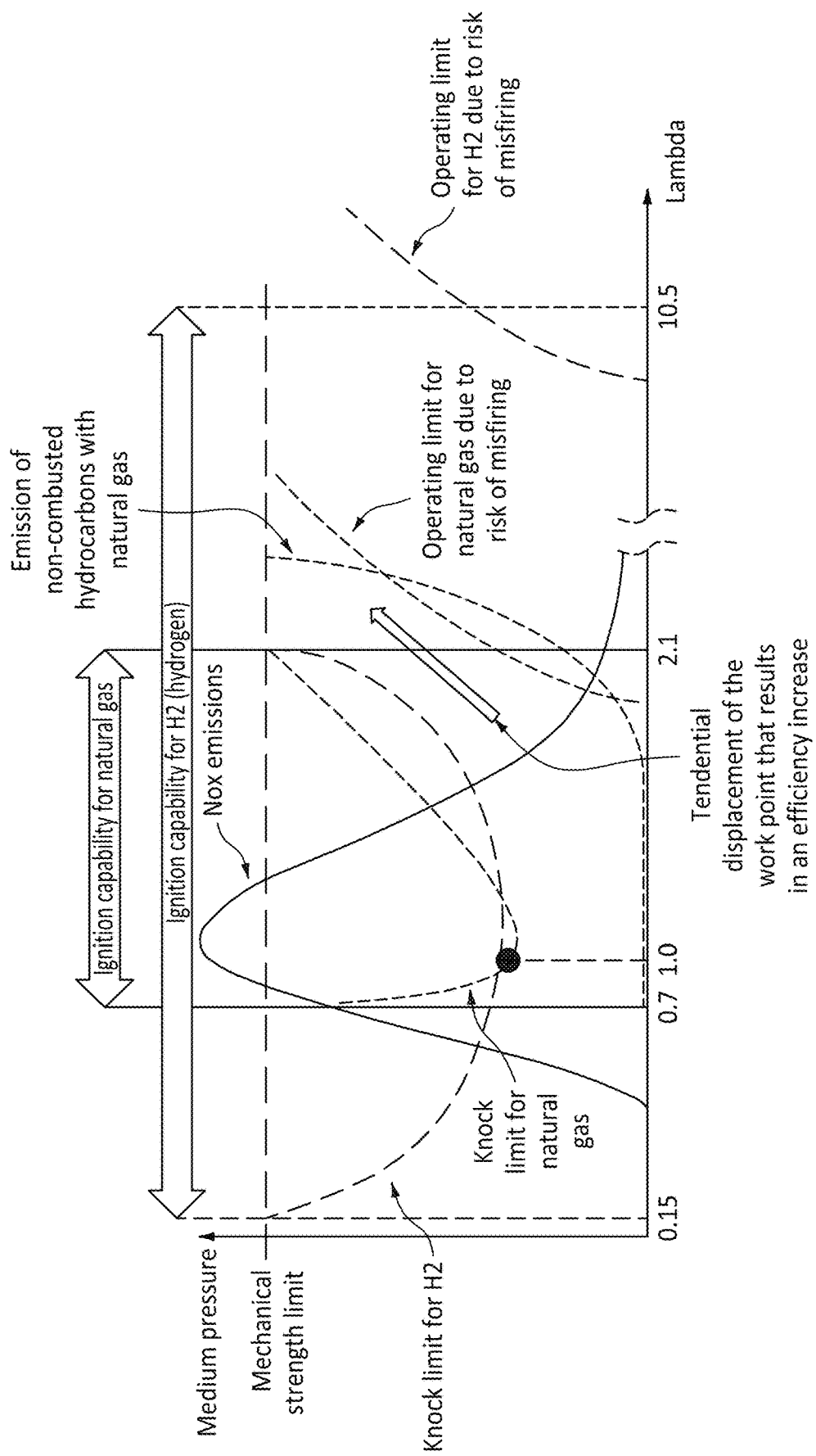
FIG. 1: an explanatory diagram in relation to a mixture in a combustion space.

FIG. 1 shows different effects for changes of the combustion air ratio lambda for the fuels of natural gas and hydrogen.

As is known, the operation of engines in the range of stoichiometric combustion with an increasing excess of air or an excess of oxygen produces an increase in nitrogen oxide emissions.

An increasingly high excess of air increases the knock limit of spark ignition engines, which can be used for an efficiency increase. The latter also applies far away from stoichiometric combustion—i.e. with lambda values considerably greater than 1—so that a decision is made with engines permanently operated at high performance and/or with engines having large mileages for a high excess of air (lambda between 1.2 to 1.5), a so-called lean combustion.

The considerably increased charge air amount that is preferably cooled to achieve an at least partial compensation of the heating produced by the compression provides an effective reduction of the combustion chamber temperature, which effects a desirable drop of the $NO_x$ emissions and an increase of the knock resistance.

The knock resistance can furthermore be increased by a very late fuel injection since the time period in which an unwanted respectively uncontrolled local ignition could take place is shortened by an extremely long amount.

The raising of lambda as desired, that is the admixing of air for an improved combustion, is also subject to practical limits since too high an air proportion in the mixture can result in misfiring. This so-called misfiring represents the unsuccessful procedure of a coordinated ignition, which results in power and efficiency losses and/or in increased untreated emissions and/or in the risk of uncoordinated delayed ignitions with corresponding subsequently disadvantages.

The above-described relationships apply generally to gas motors and in particular also to hydrogen motors.

In addition, an emission increase of non-combusted or partially combusted hydrocarbons is produced with increasing lambda for fuels containing carbon and the removal thereof in an exhaust aftertreatment is far less complex than the reduction of nitrogen oxides.

Against this background, there is the desire for a motor operation at high lambda values. This in particular also applies to hydrogen since its ignition capability comprises a very much larger lambda range than that of natural gas.

With spark ignition engines, the activation energy required to trigger the ignition in the combustion space is introduced from the outside; typically by a spark plug. Only a comparatively small amount of activation energy is thus initially available so that a comparatively high ignition capability of the mixture is essential. A sufficiently high combustion rate is furthermore essential to also be able to reach higher engine speeds.

The propagation of the ignition spark and thus the range in which the primary ignition energy is introduced in the combustion space is practically not reproducible. In accordance with the present prior art, the ignition propagation in the combustion space of a spark ignition engine differs greatly from the ideal procedure in the presence of a comparatively wide spread.

Some of the previously explained disadvantages that result from a high lean combustion can be at least partly compensated by the use of prechamber ignition systems.

The volume of the main combustion space exceeds the inner volume of its associated prechamber by orders of magnitude. The energy content of an ignition spark of a common spark plug therefore represents an adequate proportion of the activation energy for the ignition of the total mixture present in the prechamber. The mixture ignited in the prechamber that in turn releases a multiple of the energy of a spark plug ignition spark is injected through the transfer ports into the main combustion space and there provides a multiple ignition at different locations, and indeed within a short time period.

A non-flushed prechamber receives its mixture in the course of the compression during the compression phase of the cylinder. Apart from a small residual amount of compressed exhaust gas, the composition of the mixture in the prechamber results from the procedures in the main combustion space. The fuel supply into the main combustion space has to take place in good time before the triggering of the ignition spark so that a sufficient supply of the prechamber is ensured in the course of the compression.

A flushed prechamber in contrast has its own fuel supply. The air supply into the prechamber equally takes place via the compression taking place in the main combustion space. The air supply or oxygen supply for the prechamber therefore takes place via the mixture from the main combustion space. The fuel supply into the prechamber preferably takes place at a late point in time. Those lambda values that are particularly capable of ignition (lambda=1 or a small excess of air) can thereby also be controllable because the time period up to the defined occurrence of the ignition spark triggered by the spark plug is correspondingly short and no independent ignition therefore takes place due to hot spots at the prechamber wall that may be present.

With respect to dynamically operated engines, in particular gas engines, a flushed prechamber can be operated independently of the instantaneous operating point of the engine at an almost unchanging combustion air ratio that is particularly advantageous for the ignition of the mixture in the prechamber there.

The much larger part of the energy conversion takes place in the main combustion space that is preferably set to lean operation so that said advantages of a high efficiency and small untreated emissions come fully into effect there. Only the energy conversion amounting to approximately 1% (of the total energy of the combustion procedure of a cylinder) in the prechamber for the provision of the ignition energy for the mixture may take place at such poor efficiencies and possibly increased untreated emissions.

FIG. 2 now shows a schematic representation of an engine 1 having an associated main combustion space 2. A displaceably supported piston 16 is arranged therein that can greatly compress the mixture present in the main combustion space 2. As usual, the arrangement 1 has an air inlet 17 and an air outlet 18 that can be closed by corresponding valves 19, 20. In this respect, with a corresponding position of the at least one inlet valve 19, fresh air is introduced into the main combustion space 2 and the by far predominant portion of the combustion exhaust gas is led off from the main combustion space 2 via the at least one outlet valve 20 after the combustion.

The prechamber 3 that is separated via a separating wall 8 provided with passages is likewise in fluidic communication with the main combustion space 2. An ignition device 4, for example a spark plug, and an injector 5 are present in this prechamber 3. Since fuel is introduced directly into the prechamber via the injector 5, the present representation is a flushed prechamber 3 that is sometimes also called an active prechamber.

In accordance with the prior art, the fuel for the mixture to be ignited in the main combustion space 2 is introduced via an injector 21 arranged in the main combustion space.

FIG. 3 shows an embodiment of the invention that is characterized by the presence of only one injector 5 that is arranged in the prechamber 3 or projects into it and the fuel is therefore injected into the prechamber 3. In accordance with the invention, the fuel required for the main combustion space is also discharged from the injector 5 projecting into the prechamber 3 so that the fuel first has to flow from the prechamber 3 into the main combustion space 2. This means in a manner of speaking that from the perspective of the main combustion space 2 the transfer points 6 of the prechamber 3 take over the function of the injector nozzles during the fuel charging of the main combustion space, but not the complete function of the injector.

Since now no further injector 21 is provided, the prechamber 3 can be arranged at a position that is advantageous for the inflow of the fuel into the main combustion space 2 and for the injection of the ignition torches into the main combustion space 2. In addition, the required number of components is significantly lowered since now one injector fewer is present and the accompanying feed line and control are also omitted.

FIG. 4 here shows an advantageous embodiment of the invention in which the prechamber 3 is arranged in the axis of symmetry S of the main combustion space 2 so that a particularly uniform distribution of fuel in the main combustion space 3 occurs on the outflow of fuel from the prechamber 3 into the main combustion space 2. This arrangement position of the prechamber 3 is of particular advantage since the ignition torches injected from the transfer points can thus also lead to a uniform ignition of the mixture in the main combustion space. 2.

FIG. 5 shows an enlarged view of the prechamber 3 in which now also the transfer points 6 (in part also called prechamber outlets) can be easily recognized that connect the prechamber 3 to the main combustion space 2 through the separating wall 8. The outlet end of an injector 5 that not only provides the fuel for the ignition of the prechamber 3, but also a highly precisely metered fuel amount for the combustion process in the main combustion space 2 projects into the interior of the prechamber 3. A spark plug 4 is further additionally also provided there whose spark gap is formed in the prechamber 3 that can, for example, carry out an ignition of the mixture in the prechamber 3 by a direct flash over.

Figure 6:
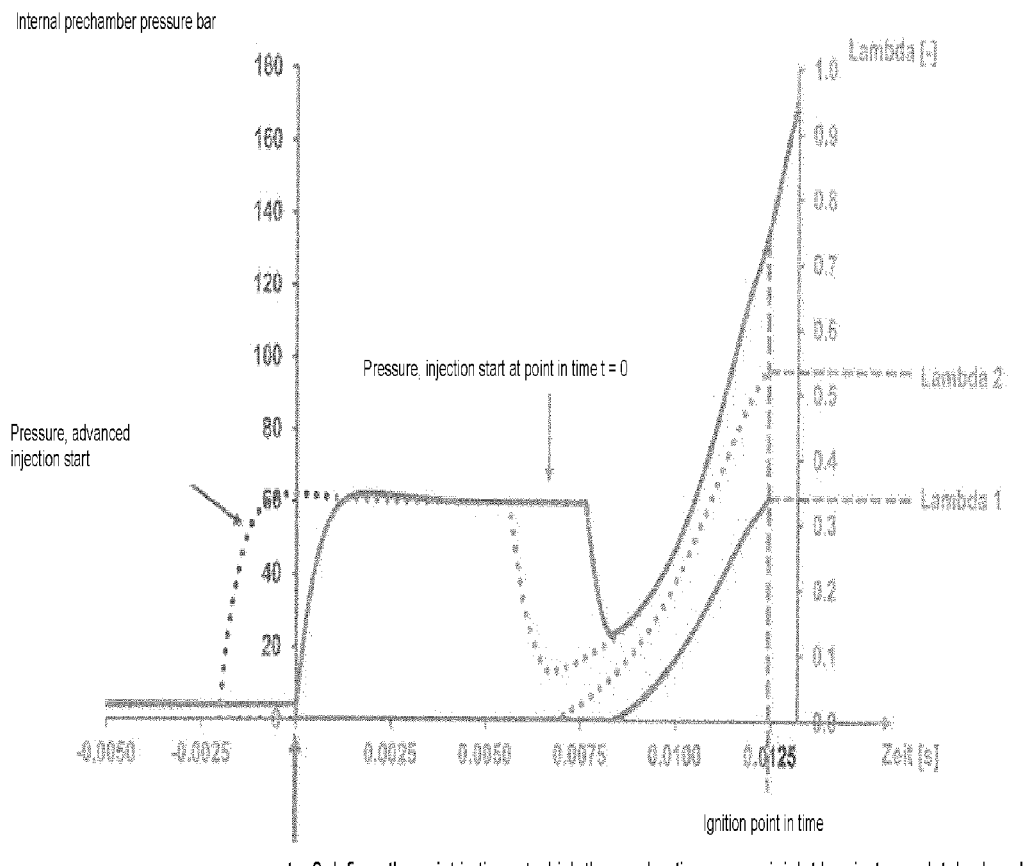
FIG. 6: a diagram to explain the pressure values and the lambda values in the prechamber during a partial work cycle of the engine.

FIG. 6 shows the time progressions of the internal prechamber pressure and of the combustion air ratio lambda of the prechamber mixture for two procedures having different injection times.

The time progressions of these two cycles are placed over one another in the representation such that the fixed time t=0 exactly corresponds to that point in time at which the air inlet valves 19 have just closed completely.

In the case of the pressure curve entered over time by the solid line, the fuel injection start takes place at exactly this point in time. In the other cycle with the dotted line, the fuel injection start already takes place before the closing of the air inlet valves. It is clear to the skilled person that an advanced fuel injection start may only take place briefly before the closing of the air inlet since otherwise fuel could enter into the air inlet 17 on a high pressure injection.

The diagram will first be described with reference to the continuous lines in which an injection of fuel starts precisely when the air inlet of the main combustion space 2 is closed.

It can be recognized that a certain internal pressure is already present before the fuel injection start in the prechamber 3, which is due to the air pressure of the charge air.

The exhaust gas remaining in the prechamber 3 from the preceding expansion phase is already displaced from there shortly after the fuel injection start quasi completely into the main combustion space 2. The influence of this exhaust gas amount in the main combustion space 2 can be neglected due to the small amount since this amount originates from the volume of the prechamber 3 that is very much smaller in comparison with the combustion space 2.

Only fuel is present in the prechamber 3 almost directly after the start of the fuel injection. The combustion air ratio lambda is consequently at the value 0. The fuel injected into the prechamber 3 moves over the fluid connection that is present in the separating wall 8 and that comprises at least one so-called transfer point 6 into the main combustion space 2. The combustion air ratio lambda increases there from that point in time onward at which the fuel injection has been interrupted. This point in time can be recognized from the graph by the sudden pressure drop (for the continuous line at 0.0075 s).

Since the total cross-section of the transfer points 6 between the prechamber 3 and the main combustion space 2 is correspondingly small, a pressure of approximately 60 bar is present during the fuel injection in the prechamber 3, said pressure being higher during this time period than the pressure in the main combustion space 2, whereby a pressure drop initially starts there after the end of the injection procedure in the prechamber 3. As the piston movement progresses in the main combustion space 3, the mixture compression continues and finally effects the overflow of the mixture from the main combustion space 2 into the prechamber 3.

The increase of the internal prechamber pressure continuing after the ignition of the mixture can be explained by the expansion of the ignited mixture and results in the urging back of the piston in the direction of bottom dead center.

The fuel injection necessarily has to be terminated before the end of the compression cycle of the cylinder because the prechamber 3 has to have a certain amount of the mixture present in the main combustion space 2 supplied to it so that the oxygen required for the prechamber ignition is present.

An increase of the combustion air ratio lambda starting from the value 0 can be recognized in said diagram, and indeed at exactly that point in time at which the previously explained abrupt pressure drop starts in the prechamber. The conditioning of the prechamber charge to two different variants has to be terminated before the ignition is triggered via the spark plug 4.

In the first variant, that is represented by the diagram of FIG. 6, this conditioning results solely from the retroactions of the (i) mixture state (lambda, pressure, temperature, etc.) in the main combustion space 2 at the end of the fuel injection and (ii) the mixture state change in the main combustion space 2 due to the continuing compression that results in the overflowing of a certain portion of mixture from the main combustion space 2 into the prechamber 3. Due to the extremely small portion of the mixture displaced from the main combustion space 2 into the prechamber 3, this has no significance for the mixture present in the main combustion space 2. This displacement is, however, of fundamental importance for the prechamber 3 since air moves into the prechamber 3 in this manner and the combustion air ratio lambda is adopted in the prechamber 3 in dependence thereon, is ignited by the ignition spark, and in turn takes the ignition energy into the main combustion space 2.

A combustion air ratio lambda of approximately 0.33 is present in the diagram for the case that the injection exactly coincides with the closing of the air inlet.

In the embodiment having the dotted lines, in which the fuel injection has already started before the air inlet 17 has completely closed, the combustion air ratio lambda has a value of approximately 0.53 at the ignition point in time.

The time periods within which these procedures take place can, however, be so brief that the combustion air ratio lambda is also not homogeneous in a small volume such as a prechamber 3. The basic idea of the invention is therefore in particular suitable for a hydrogen engine. For a hydrogen air mixture is already capable of ignition with a very small air portion (up to a minimal lambda of 0.15), whereas this design example with lambda values smaller than 0.7 would be unsuitable for a gas engine operated with natural gas (methane).

In a second variant, said retroaction in the prechamber 3 starting from the main combustion space 2 does not alone lead to the conditioning of the mixture there, but a further influence is rather provided in that a very briefly lasting further fuel injection takes place after mixture has already been displaced from the main combustion space 2 into the prechamber 3. However, this should be a very small injection amount since otherwise too large a proportion of air present in the prechamber 3 would be outwardly displaced. Such an injection taking place directly before the ignition point in time could serve a fine comparison of the combustion air ratio lambda in the prechamber 3 or, on other words, have the purpose of a local increase of the fuel portion in a partial region of the prechamber 3.

The progressions shown in FIG. 6 relate to a hydrogen engine at the work point of its maximum output power of 450 kW at a speed of 1900 $min^{-1}$ and thus a constellation that is very demanding for the system in accordance with the invention. At this work point, the maximum fuel amount has to be supplied by the injector 5 injecting into the prechamber 3 via the transfer points 6 into the main combustion space 2. In this respect, this procedure has to be terminated in good time so that a sufficiently high amount of mixture is still displaced from the main combustion space 2 into the prechamber 3. A sufficiently high combustion rate furthermore has to occur in the main combustion space to cover the high speed. The injection rate amounts to approximately 11.5 g/s, the injection duration approximately 7.63 ms (and the hydrogen amount consumed within such a work cycle approximately 0.088 g).

In an engine operation in accordance with the first variant, the conditioning of the prechamber charge is predetermined by the injection start of the last partial injection because the end of this injection procedure has already been fixed by the fuel amount to be supplied to the main combustion space 3.

In accordance with the second variant, a flexible lowering of the combustion air ratio lambda, i.e. an increase of the fuel portion in the prechamber 3, is possible.

So that the possible improvement potential possible by such corresponding interventions can be used in the second variant, a corresponding sensor system is advantageous or necessary through hardware and/or software. Said actuator system and the sensor system is then a component of one or more controls and/or regulations. At least some of these controls and/or regulations is preferably present as software that is in turn implemented on a processing unit. This software then includes the required virtual sensors, for example, in the form of processing models and/or state estimators and characteristic fields, regulators, parameters, etc. The engine control device particularly preferably takes over the function of this processing unit. This processing unit can naturally also be distributed over physically different control devices, Possible input values of such software are: crankshaft sensor, camshaft sensor, rail pressure, the output value of an altitude pressure sensor, temperatures (air gap at the outlet of the charge air cooler, exhaust gas manifold, oil, cooling water, etc.).

Possible operands that in turn serve as input values of specific part models are: crankshaft phase angle, engine speed, fuel target injection amount, inner combustion space pressure, etc.

The use of the system in accordance with the invention is above all very promising for the use of hydrogen in internal combustion engines or for such a use of fuel mixtures that contain a high proportion of hydrogen and other fuels whose ignition capability has a correspondingly large spectrum over the combustion air ratio lambda.

A use of the system in accordance with the invention is aimed for in an engine 1 that preferably works in extremely lean operation. A combustion air ratio of lambda=3 (i.e. a threefold oxygen surplus) or even a combustion air ratio that comes substantially closer to the ignition capability limit of hydrogen (lambda=10.5) is aimed for. The engine 1 is in particular operated with hydrogen or with a fuel that contains hydrogen as the main component or as an admixture or it is a fuel similar to hydrogen or it is another fuel that has an ignition capability for lambda above 2.5 and particularly preferably an ignition capability for lambda equal to or above 3 and very particularly preferably an ignition capability for lambda equal to or above 5.

The high excess of air effects a correspondingly large raising of the knock limit, which is used to increase the compression ratio to achieve an efficiency increase. The knock resistance does not, however, only represent a limiting of the compression ratio, but also the load capability of the prechamber. In the event that the engine is operated with hydrogen or with a fuel that contains hydrogen as the main component or as an admixture or that it is a fuel similar to hydrogen, the compression ratio is preferably between 11 and 20, particularly preferably between 11 and 17, and very particularly preferably between 12 and 15.

An extremely high charging is necessary for such an extremely lean combustion engine 1 in accordance with the invention so that it reaches a comparatively high power density as an engine 1 that is operated close to the stoichiometric combustion air ratio of lambda=1 and that is otherwise comparable. A multistage charging, particularly preferably supplemented by at least one charge air intercooler, is accordingly preferred for an engine 1 in accordance with the invention.

Figure 7:
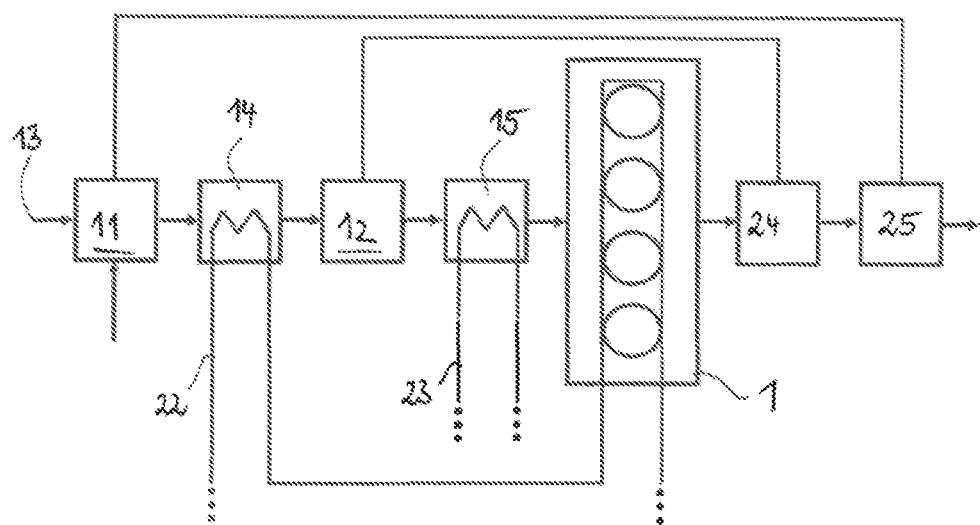
FIG. 7: an embodiment of the present invention with an air supply charged in multistages and with a multistage charge air cooling.

FIG. 7 shows an embodiment of a concept known per se. It is a two-stage charging 11, 12 having a two-stage cooling 14, 15 in which the charge air compressed in the first compressor 11 is first conducted through a charge air cooler 14 and is subsequently compressed again in a second compressor 12 and is cooled again in the charge air cooler 15 connected downstream.

The presence of a charge air cooler 14 that is called a charge air intercooler is provided between the two compressors 11, 12 arranged in series in the charge air path 13. At least one so-called charge air intercooler 14 is very particularly preferably present between two respective compressors 11, 12 arranged in series along the charge air path 13. At least one of these charge air coolers 14, 15 is equally particularly preferably connected to a low temperature circuit 23 at the secondary side. It is a cooling circuit separate from the primary cooling circuit 32 of the engine 1. If such a low temperature cooling circuit 23 is present, the primary cooling circuit is also called the high temperature cooling circuit 22. The two respective circulation pumps and heat exchangers by which the thermal power removed from the respective cooling circuit 23, 23 to the waste heat sources of the engine 1 is led off to the environmental air are separate from one another in these two cooling circuits 22, 23.

Due to the comparatively small flow temperature, the operation of the low temperature circuit 25 requires a comparatively high performance so that an operation according to requirements of its circulation pump and/or of the fan that supports the heat dissipation to the environmental air is preferred.

A two-stage charge air cooler 15' could be used instead of a single stage charge air cooler 15, with the secondary side of a first stage preferably being connected to the high temperature cooling circuit 22 and the secondary side of the second stage preferably being connected to the low temperature cooling circuit 23.

A certain amount of water can be injected in the charge air path 13 as additional cooling. The water can in this respect be acquired as a condensate from the exhaust gas.

A concept of charging is preferred that enables a charging that is particularly adapted to requirements since an unnecessarily high charging in the lower and medium partial load engine operation would result in appreciable unnecessary energy feeds due to the demand of being able to reach high charges. At least one controllable or regulable compressor is accordingly preferably used to compress the charge air, for example an exhaust gas turbocharger having an individually adjustable waste gate and/or a turbocharger having a variable turbine geometry (a so-called VTG charger) and/or a charger driven via an electric motor and/or mechanically by a power take-off of the engine, etc.

The use of prechambers for hydrogen engines is by no means odd because the ignition of hydrogen is, contrary to popular opinion, not completely uncomplicated. The ignition energy for a hydrogen-air mixture is admittedly extremely low, but the required ignition temperature is comparatively high at 585° C. Due to said advantages, operation with an extremely high excess of air is aimed for, which in turn makes the provision of a sufficiently high temperature to ignite hydrogen more difficult.

The mentioned high increase of the hydrocarbon emission with a high lean operation is more or less irrelevant with hydrogen engines since only extremely small amounts of carbon can enter into the combustion space, and indeed due to contaminants in the hydrogen and from marginally present combusted engine oil.

The emissions of nitrogen oxides, that are small due to the highly lean operation, are fully effective in the embodiment in accordance with the invention as a hydrogen engine. There is therefore a high potential in the hydrogen engine in accordance with the invention for the simplification of its exhaust aftertreatment or even the possibility of being able to completely dispense with an exhaust aftertreatment. Provided that the air gaps of specific filters or catalytic converters can be reduced up to being dispensed with, this provides an appreciable potential for lowering the exhaust gas counter-pressure, which in turn brings about fuel saving.

Figure 8:
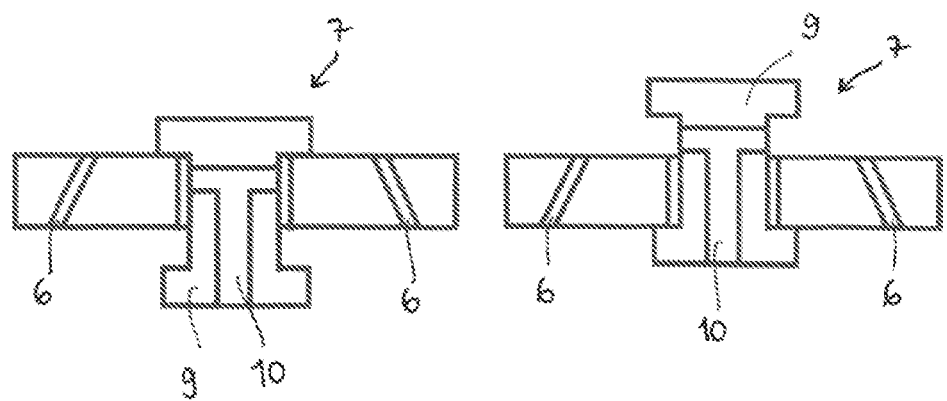
FIG. 8: two representations of a valve arranged in the separating wall in different states.

The further development of the invention shown in FIG. 8 leads to a considerable, up to complete, removal of the conflicting goals via the total flow cross-section of the connections between the prechamber 3 and the main combustion space 2 that, on the one hand, rather has to be large for the charging of the main combustion space 2 with the fuel flowing in via the prechamber 3 and equally for the air supply into the prechamber 3 before the ignition time, but, on the other hand, a small total flow cross-section is advantageous for the effective penetration of ignition torches.

In the further development, a valve 7 is located in a region of the prechamber wall 8 that is adjacent to or projects into the main combustion space 2. The valve 7 is preferably arranged such that the flow that occurs with an open valve 7 is symmetrical to the axis of symmetry S of the main combustion space 2.

The additional flow cross-section between the prechamber 3 and the combustion space 2 with the open valve 7 preferably has approximately the same size as the total flow cross-section of the transfer points 6. In more precise terms, the fluid connection additionally provided with the open valve 7 should be approximately dimensioned such that approximately half the gas flow (a) fuel or b) mixture (depending on the time period in the work cycle) flows through the opening cross-section of the valve 7. It is advantageous if, on the inflow of the fuel from the prechamber 3 into the main combustion space 2, an appreciable proportion takes place via the transfer points 6 because the transfer points 6 are already designed in their function serving as prechamber outlets such that an effective swirling is also present on the throughflow of fuel to charge the main combustion space 2. The same demand is also present on the inflow of mixture into the prechamber 3.

With respect to this valve 7, operating situations a) to f) exist in use in a four stroke engine that will be explained in the following and that are supplemented with the indication of the preferred valve position, and indeed for the case that it is a passive valve:
a) fuel ignition and expansion in the prechamber 3: the valve 7 has to be closed;
b) fuel expansion in the main combustion space 2: due to the actual function, the valve position is not important here; however, it appears advantageous that the valve 7 adopts such a position in which it is better protected due to the great expansion in the main combustion space 2;
c) expulsion of the exhaust gas from the main combustion space 2: the valve position is unimportant in principle;
d) intake, optionally intake without fuel injection the valve position is unimportant in principle;
e) fuel injection: there is optionally an internal time window in which the valve 7 is open within the time period in which fuel is injected into the prechamber 3;
f) compression in the main combustion chamber 2 after termination of the fuel injection: the valve 7 is preferably open: there is an internal time window in which the valve 7 is open within this time period.

In this respect the closure element of the valve 7 can be correspondingly preloaded by a suitable spring so that it is closed when the mixture in the prechamber 3 has just ignited, which simultaneously corresponds to the time period in which the excess pressure present in the prechamber 3 is highest with respect to the pressure present in the main combustion space. This additional flow cross-section is therefore not available to the ignition torches, but they can only be propagated via the transfer points that can therefore be optimized to their function serving as so-called prechamber outlets. They can thus have a sufficiently small total flow cross-section, an advantageous distribution over a favorable number of individual transfer points 6, an optimum arrangement in the prechamber wall adapted thereto, and an adapted contour shape.

Unlike in the schematic representation of FIG. 8, the end face of the valve plunger 9 projecting into the prechamber 3 with a closed valve 7 should terminate as areally as possible with the inner side of the front chamber wall 8.

On the use of such a valve 7 in a two stroke engine, the same relationships apply as with a four stroke engine with respect to preferred valve positions in dependence on the material flows (fuel, mixture, and ignited prechamber mixture) between the prechamber and the main combustion space.

Irrespective of the design of the engine 1, such a valve 7 would preferably be used that can be opened and closed in a controllable manner.

The valve 7 would then particularly preferably close (briefly) before the end of the charging of the main combustion space 2 so that the fuel amount supplied into the main combustion space 2 at the end is completely conducted through the transfer points 6 and therefore provides an additional swirling advantageous for a better mixture formation in the main combustion space 2.

If a high amount of oxygen or air is required in the prechamber 3, the valve 7 is temporarily opened during the operating phase in which the air charging of the prechamber 3 takes place via the inflow of mixture from the main combustion space 2. The valve 7 is particularly preferably then closed (briefly) before the end of the charging so that the mixture urged into the prechamber 2 at the end is completely conducted through the transfer points 6 and therefore provides additional swirling advantageous for a better mixture formation in the prechamber 3 that results from the fuel in the prechamber 3 and from the mixture flowing in from the main combustion space 2.

Irrespective of whether it is a passive or an actively controllable valve 7, the additionally available flow cross-section provides a corridor (I) for a lowering of the fuel injection pressure, (ii) the possibility of a later fuel injection with the already explained advantages, and (iii) a simplification of providing higher oxygen proportions in the prechamber 3, i.e. of achieving a raising of the combustion air ratio lambda; at least an approximation to the value 1 so that the invention also applies to engines 1 operated with natural gas.

The latter is sensible to, on the one hand, be able to supply an amount of fuel to the small internal volume of the prechamber 3 that is as high as possible and to use it in its function as an ignition amplifier. Furthermore, in this manner, the prechamber 3 can be operated such that the combustion of the mixture there takes place as closely as possible to the maximum possible temperature, which is in particular of advantage for a hydrogen engine.

If an exhaust aftertreatment without an SCR system is aimed for with the hydrogen, it can naturally be more expedient to set the combustion air ratio lambda to a value that results in an optimum between the two contrary demands of a high temperature and NOx emissions that are as small as possible.

An observation of the emissions caused by the combustion in the prechamber 3 is also relevant under the condition of a non-use of exhaust aftertreatment. As is known, there are very low limit values for exhaust gas pollutants. If they are exceeded, an exhaust aftertreatment is obligatory. Since the operation management in the main combustion space 2 runs in an extremely low pollutant manner, the emissions caused in the prechamber 3 can be relevant to the system.

It is thus possible in accordance with the invention that both, first the supply of the fuel flows into the main combustion space in a comparable manner as with a direct injection at high pressure and with an advantageous spray pattern and in this respect all the openings via which the fuel jets penetrate into the main combustion space are particularly advantageously positioned as is the case with a direct injection, but at the same time, second, the injection of the ignition torches into the main combustion space 2 can take place starting from the optimum position, which is only possible by a device in accordance with the invention.

It is furthermore advantageous that only one single injector 5 is required per main combustion space 2 of a cylinder having a flushed prechamber 3. Two injectors are required for this purpose in accordance with the prior art. This saving is naturally not only restricted to the component, but also includes the periphery, e.g. the fuel supply and the injector control.

In addition, a further increase of the combustion air ratio lambda can also possibly be decisive to achieve at least one further discrete step to reduce the exhaust aftertreatment, e.g. the use of a smaller construction size or the omission of a total stage, for example the omission of the SCR system, up to a complete saving of an EGA system.

It must finally be pointed out that the invention may not be confused with that having a prechamber diesel engine. The object of the prechamber of a prechamber diesel engine is the fuel atomization. An engine in accordance with the invention in contrast receives the already atomized fuel due to the high pressure injection. The primary function of the prechamber of an engine in accordance with the invention is that of an ignition amplifier. The volumes of the prechamber and of the main combustion space therefore differ by orders of magnitude in an engine in accordance with the invention that can exceed decimal powers, while there is only a factor of the order of magnitude of 3 with a prechamber diesel engine.

REFERENCE NUMERAL LIST 1 motor
2 main combustion space
3 prechamber
4 spark plug/ignition device
injector
6 transfer point
7 valve
8 wall between prechamber and main combustion space
9 valve plunger
10 fluid connection through open valve
11 first compressor
12 second compressor
13 charge air path
14 first charge air cooler
15 second charge air cooler
16 piston
17 air inlet
18 air outlet
19 inlet valve
20 outlet valve
21 injector in main combustion space
22 cooling circuit
23 low temperature circuit
24 HD turbine
LD turbine
S axis of symmetry

The invention claimed is:

1. An engine (1) comprising prechamber ignition, in particular a gas engine, comprising:
a main combustion space (2) in a cylinder of the engine (1) for combusting an air-fuel mixture; and
a prechamber (3) having an ignition device (4) projecting into it and a fuel injector (5) projecting into it,
wherein the prechamber (3) has at least one transfer point (6) that fluidically connects the prechamber (3) to the main combustion space (2),
the fuel injector (5) projecting into the prechamber (3) is the only fuel injector (5) via which fuel can be introduced into the associated main combustion space (2),
the fuel is hydrogen or contains more than 70% molecular hydrogen as the main component or as an admixture, and
a water spray device for spraying water into the charge air path is provided for cooling the charge air, with the water sprayed into the charge air path being a condensate from the exhaust gas.

2. The engine (1) in accordance with claim 1, wherein a respective separate charge air cooler (14, 15) is connected directly downstream of the multistage charging with at least two compressor units (11, 12) connected in series, and the charge air coolers (14, 15) are preferably integrated in mutually independent cooling circuits at the secondary side of which one is preferably not in fluidic communication with a primary cooling circuit (14) connected to the engine.

3. The engine (1) in accordance with claim 2, wherein the charge air cooler (15) separate from the primary cooling circuit of the engine and also called a low temperature circuit has a circulation pump and/or fan arranged to operate on demand to dissipate heat to the environment, wherein additionally the engine comprises a controlled or regulated electric machine for driving the circulation pump and/or fan in the low temperature cooling circuit (23).

4. The engine (1) in accordance with claim 1, wherein the charging is variable in performance, preferably by a controllable or regulable compressor, wherein the compressor is a turbocharger having a controllable waste gate, and/or variable turbine geometry, and/or a charger driven by at least one of an electric drive and power take-off from the engine.

5. The engine (1) in accordance with claim 1, wherein said main combustion space (2) is more than 10 times the size of the prechamber (3) which acts as an ignition amplifier, preferably more than 50 times the size of the prechamber (3).

6. The engine (1) In accordance with claim 1, wherein the fuel injector is configured to inject the fuel having a pressure in the range from 200 to 500 bar, preferably 200 to 400 bar, more preferably 250 to 350 bar, and very particularly preferably in the range from 290 to 310 bar.

7. The engine (1) in accordance with claim 1, having a compression ratio between 11 and 20, preferably between 11 and 17, and most preferably between 12 and 15.

8. The engine (1) in accordance with claim 1, wherein a total cross-section of the transfer ports is between 3 mm$^2$ and 12 mm$^2$, preferably between 3.5 and 10 mm$^2$, and most preferably between 4 mm$^2$ and 8 mm$^2$.

9. The engine (1) in accordance with claim 1, wherein volume of the main combustion space (2) is in the range from 1.5 to 3 liters, preferably from 2 to 2.5 liters, and volume of the prechamber (3) is from 1 to 5 ccm, preferably 2 to 3 ccm.

10. The engine (1) in accordance with claim 1, further comprising a valve (7) in a wall (8) separating the prechamber (3) and the main combustion space (2) that provides a selectively additional fluidic connection (10) between the prechamber (3) and the main combustion space (2) beside the at least one transfer point (6).

11. An engine (1) comprising prechamber ignition, in particular a gas engine, comprising:
a main combustion space (2) in a cylinder of the engine (1) for combusting an air-fuel mixture; and
a prechamber (3) having an ignition device (4) projecting into it and a fuel injector (5) projecting into it, wherein
the prechamber (3) has at least one transfer point (6) that fluidically connects the prechamber (3) to the main combustion space (2),
the fuel injector (5) projecting into the prechamber (3) is the only fuel injector (5) via which fuel can be introduced into the associated main combustion space (2),
the fuel is hydrogen or contains more than 70% molecular hydrogen as the main component or as an admixture, and
a quotient of (i) volume of the main combustion space (2) at a top dead center of a piston therein, and (ii) volume of the prechamber (3), is between 0.6 and 3%, preferably between 0.75% and 2.8%, and most preferably between 0.9% and 2.7%.

12. An engine (1) comprising prechamber ignition, in particular a gas engine, comprising:
a main combustion space (2) in a cylinder of the engine (1) for combusting an air-fuel mixture; and
a prechamber (3) having an ignition device (4) projecting into it and a fuel injector (5) projecting into it, wherein
the prechamber (3) has at least one transfer point (6) that fluidically connects the prechamber (3) to the main combustion space (2),
the fuel injector (5) projecting into the prechamber (3) is the only fuel injector (5) via which fuel can be introduced into the associated main combustion space (2),
the fuel is hydrogen or contains more than 70% molecular hydrogen as the main component or as an admixture, and
a quotient of (i) volume of the main combustion space (2) at a top dead center of a piston therein, and (ii) total cross-section of transport ports, is between 12 and 90 meters, preferably between 16 and 80 meters, and most preferably between 14 and 60 meters.

13. A method of operating an engine (1) comprising prechamber ignition, in particular a gas engine, comprising the combination of:
a main combustion space (2) in a cylinder of the engine (1) for combusting an air-fuel mixture;
a prechamber (3);
an ignition device (4) projecting into the prechamber; and
consisting of a fuel injector (5) projecting into the prechamber (3),
wherein the prechamber (3) has at least one transfer point (6) that fluidically connects the prechamber (3) to the main combustion space (2),
comprising operating the engine with a fuel which is hydrogen or contains more than 70% molecular hydrogen as the main component or as an admixture, said fuel always having an ignition capability for lambda at or above 2.5 and particularly preferably an ignition capability for lambda equal to or above 3 and very particularly preferably an ignition capability for lambda equal to or above 5, and operating the engine such that a quotient of (i) volume of the main combustion space (2) at a top dead center of a piston therein and (ii) volume of the prechamber (3) is between 0.6 and 3%, preferably between 0.75% and 2.8%, and most preferably between 0.9% and 2.7%.

14. The method in accordance with claim 13, wherein the fuel injector injects the fuel having a pressure in the range from 200 to 500 bar, preferably 200 to 400 bar, more preferably 250 to 350 bar, and very particularly preferably in the range from 290 to 310 bar.

15. The method according to claim 13, wherein the method performs multi-stage charging of the air provided into the main combustion space (2).

16. The method of claim 15, wherein the charge air is cooled by at least on charge air cooler (14, 15) being arranged in the charge air path between the individual charging stages.

17. The method of claim 15, wherein the charge air is cooled in each charging stage by a separate air cooler (14, 15) arranged in the charge air path downstream of the respective charging stage, in particular downstream of a compressor unit (11, 12) of the respective charging stage.

18. The method of claim 17, wherein the secondary sides of two or more separate air coolers (14, 15) are cooled by mutually independent cooling circuits (22, 23) of which at least one is not in fluidic communication with a primary cooling circuit (22) connected to the engine.

19. The method of claim 17, wherein at least one of said charge air coolers (14, 15) is cooled by a first primary cooling circuit (22) and at least one of said charge air coolers (14, 15) is cooled by a low temperature cooling circuit (23) at a secondary side thereof, wherein the first charge air cooler (14) is cooled by said primary, high temperature cooling circuit (22) and the second charge air cooler (15) is cooled by said low temperature cooling circuit (23).

20. The method of claim 19, wherein the low temperature cooling circuit (23) comprises a circulation pump and/or fan and is operated on demand to dissipate heat to the environment.

21. The method of claim 19, wherein the low temperature cooling circuit (23) is controlled by a controlled or regulated electric machine for driving the circulation pump and/or fan.

22. The method of claim 15, wherein the performance of air charging is controlled by controlling a regulatable compressor of the multi-stage charging, wherein the regulatable compressor is a turbocharger having a controllable waste gate and/or a variable turbine geometry and/or the compressor is a charger driven by at least one of an electric drive and power take-off from the engine.

23. The method of claim 13, wherein the engine is operated with a compression ratio between 11 and 20, preferably between 11 and 17, and most preferably between 12 and 15.

24. The method of claim 13, comprising the step of reducing or omitting exhaust aftertreatment.

25. A method of operating an engine (1) comprising prechamber ignition, in particular a gas engine, comprising the combination of:

a main combustion space (2) in a cylinder of the engine (1) for combusting an air-fuel mixture;
a prechamber (3);
an ignition device (4) projecting into the prechamber; and
consisting of a fuel injector (5) projecting into the prechamber (3), wherein
the prechamber (3) has at least one transfer point (6) that fluidically connects the prechamber (3) to the main combustion space (2),
the engine is operated with a fuel which is hydrogen or contains more than 70% molecular hydrogen as the main component or as an admixture, said fuel always having an ignition capability for lambda at or above 2.5 and particularly preferably an ignition capability for lambda equal to or above 3 and very particularly preferably an ignition capability for lambda equal to or above 5.
the method performs multi-stage charging of the air provided into the main combustion space (2),
water is sprayed into the charge air path for cooling the charge air, and
the water sprayed into the charge air path being a condensate from the exhaust gas.

26. A method of operating an engine (1) comprising prechamber ignition, in particular a gas engine, comprising the combination of:
a main combustion space (2) in a cylinder of the engine (1) for combusting an air-fuel mixture;
a prechamber (3);
an ignition device (4) projecting into the prechamber; and
consisting of a fuel injector (5) projecting into the prechamber (3), wherein
the prechamber (3) has at least one transfer point (6) that fluidically connects the prechamber (3) to the main combustion space (2),
the engine is operated with a fuel which is hydrogen or contains more than 70% molecular hydrogen as the main component or as an admixture, said fuel always having an ignition capability for lambda at or above 2.5 and particularly preferably an ignition capability for lambda equal to or above 3 and very particularly preferably an ignition capability for lambda equal to or above 5, and
the engine is operated with a quotient of (i) volume of the main combustion space (2) at a top dead center of a piston therein, and (ii) total cross-section of transport ports between 12 and 90 meters, preferably between 16 and 80 meters, and most preferably between 14 and 60 meters.

* * * * *